United States Patent [19]
Abe

[11] Patent Number: 5,973,859
[45] Date of Patent: Oct. 26, 1999

[54] APOCHROMATIC LENS SYSTEM

[75] Inventor: Tetsuya Abe, Hokkaido, Japan

[73] Assignee: Asahi Kogaku Kogyo Kabushiki Kaisha, Tokyo, Japan

[21] Appl. No.: 09/192,599

[22] Filed: Nov. 17, 1998

[30] Foreign Application Priority Data

Nov. 18, 1997 [JP] Japan .................................... 9-317138

[51] Int. Cl.⁶ ................................................. G20B 13/02
[52] U.S. Cl. .......................... 359/794; 359/748; 359/793; 359/661
[58] Field of Search .................... 359/794, 748, 359/646, 661, 691, 771, 784, 554, 793

[56] References Cited

U.S. PATENT DOCUMENTS

| 4,400,065 | 8/1983 | Nagler | 350/476 |
|---|---|---|---|
| 5,589,976 | 12/1996 | Kanai et al. | 359/662 |
| 5,729,390 | 3/1998 | Abe | 359/661 |

FOREIGN PATENT DOCUMENTS

| 57-93309 | 6/1982 | Japan . |
|---|---|---|
| 59-220711 | 12/1984 | Japan . |

*Primary Examiner*—Georgia Epps
*Assistant Examiner*—David N. Spector
*Attorney, Agent, or Firm*—Greenblum & Bernstein, P.L.C.

[57] ABSTRACT

An apochromatic lens system which includes, in this order from the object, a positive first lens group and a positive second lens group; wherein the following conditions are satisfied:

$$\nu_{I+} < 80 \quad (1)$$

$$\nu_{II+} > 70 \quad (2)$$

$$1.1 < f_I/f < 2.0 \quad (3)$$

wherein $\nu_{I+}$ designates the largest Abbe number of a positive lens element in the first lens group;

$\nu_{II+}$ designates the largest Abbe number of a positive lens element in the second lens group;

$f_I$ designates the focal length of the first lens group; and $f$ designates the focal length of the entire lens system.

6 Claims, 5 Drawing Sheets

FNO= 6.7

—— d LINE
----- g LINE
- - - - c LINE

-0.2  0.2
SPHERICAL
ABERRATION
CHROMATIC
ABERRATION

W= 2.5°

-0.02  0.02
LATERAL
CHROMATIC
ABERRATION

W= 2.5°

—— S
- - M

-0.2  0.2
ASTIGMATISM

W= 2.5°

-1.0 (%) 1.0
DISTORTION

FIG. 3
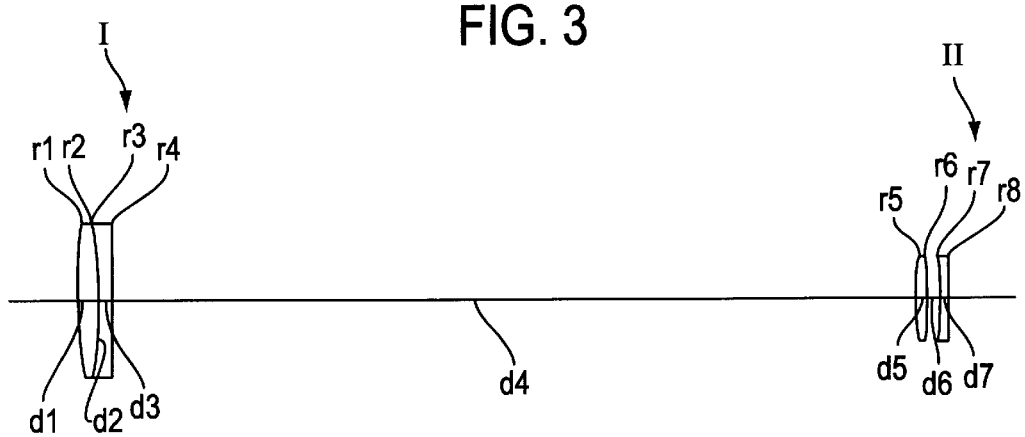
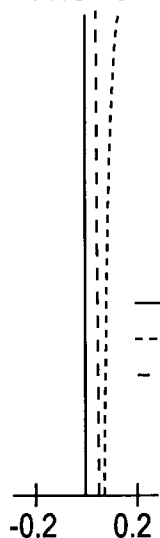
FIG. 4A
FNO= 6.7
—— d LINE
----- g LINE
--- c LINE
-0.2  0.2
SPHERICAL
ABERRATION
CHROMATIC
ABERRATION
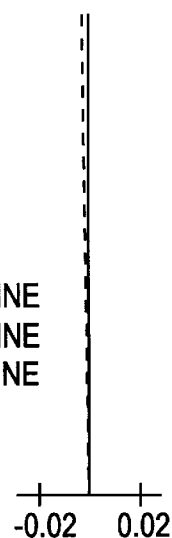
FIG. 4B
W= 2.5°
-0.02  0.02
LATERAL
CHROMATIC
ABERRATION
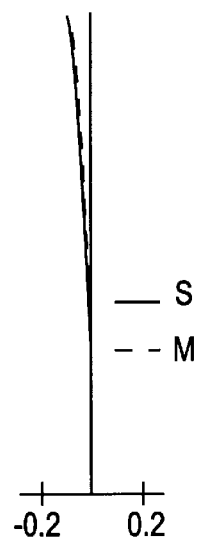
FIG. 4C
W= 2.5°
—— S
-- M
-0.2  0.2
ASTIGMATISM
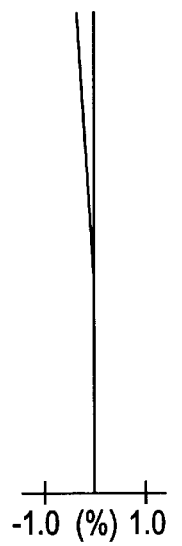
FIG. 4D
W= 2.5°
-1.0 (%) 1.0
DISTORTION

FNO= 6.7

—— d LINE
---- g LINE
-- -- c LINE

-0.2   0.2
SPHERICAL
ABERRATION
CHROMATIC
ABERRATION

W= 2.5°

-0.02  0.02
LATERAL
CHROMATIC
ABERRATION

W= 2.5°

—— S
-- -- M

-0.2   0.2
ASTIGMATISM

W= 2.5°

-1.0 (%) 1.0
DISTORTION

FIG. 7
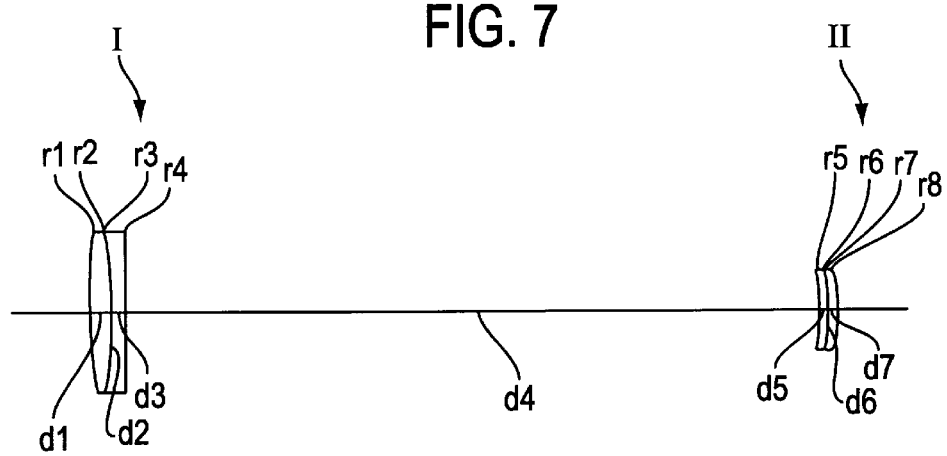
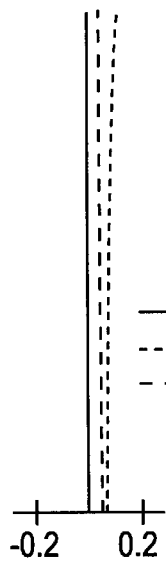
FIG. 8A
FNO= 6.7
— d LINE
--- g LINE
--- c LINE
-0.2  0.2
SPHERICAL
ABERRATION
CHROMATIC
ABERRATION
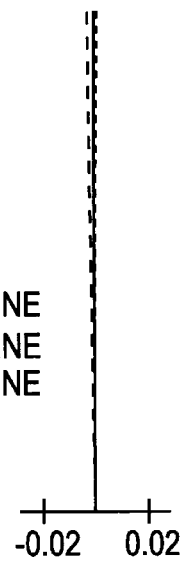
FIG. 8B
W= 2.5°
-0.02  0.02
LATERAL
CHROMATIC
ABERRATION
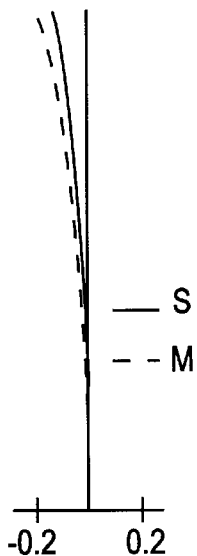
FIG. 8C
W= 2.5°
— S
--- M
-0.2  0.2
ASTIGMATISM
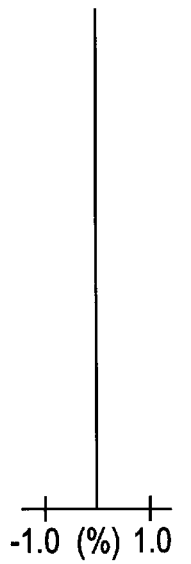
FIG. 8D
W= 2.5°
-1.0 (%) 1.0
DISTORTION

FNO= 6.7

— d LINE
---- g LINE
- - - c LINE

-0.2   0.2
SPHERICAL
ABERRATION
CHROMATIC
ABERRATION

W= 2.5°

-0.02   0.02
LATERAL
CHROMATIC
ABERRATION

W= 2.5°

—— S
- - M

-0.2   0.2
ASTIGMATISM

W= 2.5°

-1.0 (%) 1.0
DISTORTION

APOCHROMATIC LENS SYSTEM

BACKGROUND OF THE INVENTION

1. Field of the Invention

The present invention relates to an apochromatic lens system for use as an objective lens system in, for example, an astronomical telescope.

2. Description of the Related Art

It has been known that an objective lens system of an astronomical telescope has a combination of a single positive lens element and a single negative lens element, which are made from lens materials having different dispersion powers. Since the objective lens system of an astronomical telescope has a long focal length, correction of axial chromatic aberration is especially important; in recent years there have been many examples of fluorite or special low-dispersion glass being used to reduce the secondary spectrum of the axial chromatic aberrations.

As examples of objective lens systems with a large diameter, the astronomical telescopes disclosed in Japanese Laid Open Patent Publication No.57-93309 and in Japanese Laid Open Patent Publication No.59-220711 have been known. In these examples, a first lens group is composed of a combination of positive and negative lens elements made from lens materials having different dispersion power, and a second lens group distant from the first lens group toward the image is provided; correction of axial aberrations such as chromatic aberration and spherical aberration are carried out through the first lens group, and correction of field curvatures is carried out through the second lens group. Due to the above explained lens arrangement, the lens system having both a large diameter and a wide angle-of-view is materialized.

However, in both of the above-referenced astronomical telescope objective lens systems, an expensive material, such as fluorite or special low-dispersion glass, has had to be employed to make the large-diameter positive lens element in the first lens group in order to reduce the secondary spectrum of axial chromatic aberrations. These factors have resulted in an increase of the overall production costs.

SUMMARY OF THE INVENTION

The object of the present invention is to provide an apochromatic lens system having a large diameter of an aperture ratio about 1:6, and whereby axial chromatic aberration can be satisfactorily corrected.

In order to attain the above-mentioned object of the present invention, there is provided an apochromatic lens system which includes, in this order from the object, a positive first lens group and a positive second lens group; wherein the following conditions are satisfied:

$$\nu_{I+} < 80 \quad (1)$$

$$\nu_{II+} > 70 \quad (2)$$

$$1.1 < f_I/f < 2.0 \quad (3)$$

wherein $\nu_{I+}$ designates the largest Abbe number of a positive lens element in the first lens group;

$\nu_{II+}$ designates the largest Abbe number of a positive lens element in the second lens group;

$f_I$ designates the focal length of the first lens group; and $f$ designates the focal length of the entire lens system.

In order to reduce the production cost, it is practical to provide a single positive lens element in both of the first lens group and the second lens group. In this case, each of the above-referenced largest Abbe number means the Abbe number of each single positive lens element.

The following condition is preferably satisfied:

$$0.4 < L/f < 0.9 \quad (4)$$

wherein

L designates the distance from the final lens surface, from the object, of the first lens group to the first lens surface, facing the object, of the second lens group.

More concretely, the first lens group includes, in order from the object, a biconvex lens element, and a negative lens element having a strongly-powered concave surface facing the object; and the following condition is preferably satisfied:

$$-1.5 < r_1/r_2 < -0.3 \quad (5)$$

wherein $r_1$ designates a radius of curvature of the first lens surface, facing the object, of the biconvex lens element; and r2 designates a radius of curvature of the second lens surface, from the object, of the biconvex lens element.

Here, it is noted that the biconvex lens element and the negative lens element having a strong concave surface facing the object can be cemented.

The apochromatic lens system according to the present invention can be used, for example, as an objective lens for an astronomical telescope.

The present disclosure relates to subject matter contained in Japanese Patent Application No.9-317138 (filed on Nov. 18, 1997) which is expressly incorporated herein by reference in its entirety.

BRIEF DESCRIPTION OF THE DRAWINGS

The invention will be discussed below in detail with reference to the accompanying drawings, in which:

FIG. 3 is a lens arrangement of the second embodiment of an apochromatic lens system according to the present invention;

FIGS. 4A, 4B, 4C and 4D are aberration diagrams of the lens system in FIG. 3;

FIG. 7 is a lens arrangement of the fourth embodiment of an apochromatic lens according to the present invention;

FIGS. 8A, 8B, 8C and 8D are aberration diagrams of the lens system in FIG. 7;

DESCRIPTION OF THE PREFERRED EMBODIMENTS

Figure 1:
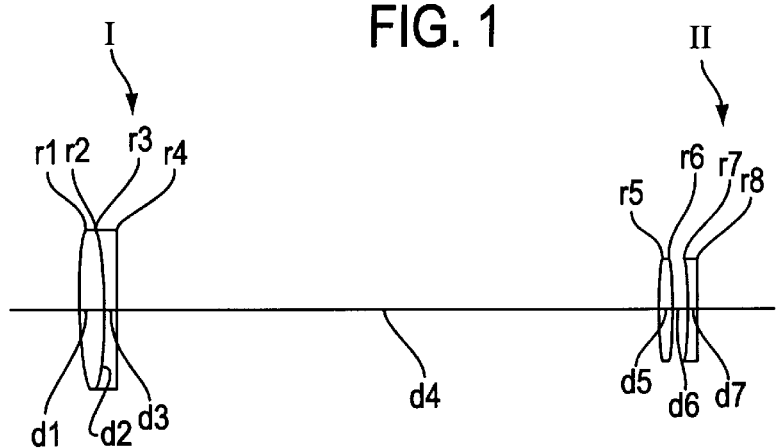
FIG. 1 is a lens arrangement of the first embodiment of an apochromatic lens system according to the present invention.
Figure 2A:
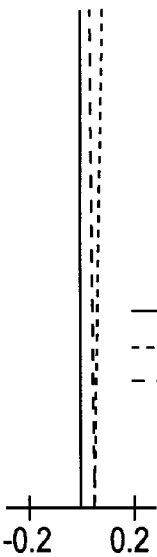
FIGS. 2A, 2B, 2C and 2D are aberration diagrams of the lens system in FIG. 1.
Figure 2B:
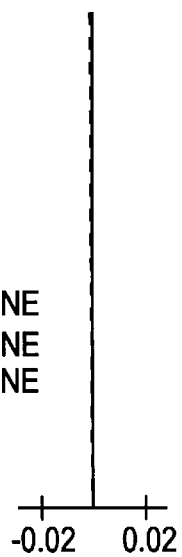
Figure 2C:
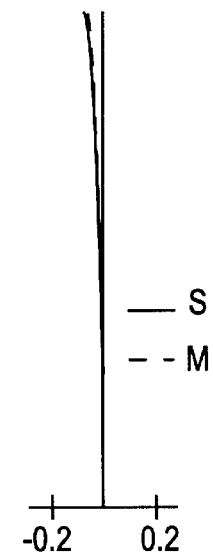
Figure 2D:
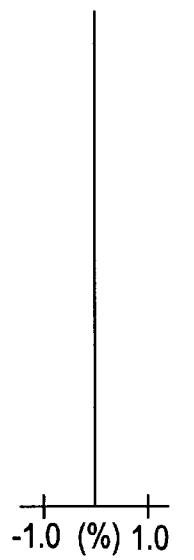

It is noted that the present invention is applied to the apochromatic lens system composed of, in order from the object, a positive first lens group and a positive second lens group; whereby the first lens group having a large diameter is made from an inexpensive lens material, and the second lens group having a small diameter is made from low dispersion glass, so that the overall production cost can be reduced and optimum optical performance can be attained through an appropriate power distribution over the first and second lens groups.

Condition (1) determines the maximum Abbe number of a positive lens element in the first lens group by utilizing an inexpensive lens material having a relatively high dispersion power (i.e., a smaller Abbe number v), so that the apochromatic lens system is produced at low cost.

If special low-dispersion glass is used to the extent that $v_{I+}$ is higher than the upper limit, the production cost increases.

Condition (2) determines the maximum Abbe number of a positive lens element in the second lens group by utilizing low-dispersion glass, so that the secondary spectrum of axial chromatic aberration can be satisfactorily corrected.

If $v_{II+}$ is lower than the lower limit, the secondary spectrum of axial chromatic aberration becomes excessive, and optimum optical performance cannot be obtained.

Condition (3) determines optimum positive power of the first lens group, so that both the low production cost and optimum optical performance are achieved.

If $f_I/f$ is lower than the lower limit, the power of the first lens group with respect to that of the entire system is too strong to reduce the secondary spectrum of axial chromatic aberration over the entire system because the contribution of the second lens group to the correcting of axial chromatic aberration is insufficient.

If $f_I/f$ is higher than the upper limit, the power of the first lens becomes too weak, so that the lens diameter of the second lens group in which the positive lens element is made from low-dispersion glass is too large. As a result, the production cost increases.

Condition (4) determines the distance between the first and second lens groups with respect to the power distribution in the first lens group determined by condition (3), so that both the low production cost and optimum optical performance are achieved.

If L/f is lower than the lower limit, the diameter of the second lens group in which the positive lens element is made from low-dispersion glass becomes too large, so that the production cost increases.

If L/f is higher than the upper limit, an incident height of axial rays to the second lens group is too low to reduce the secondary spectrum of axial chromatic aberration over the entire system because the contribution of the second lens group to the correcting of axial chromatic aberration is insufficient.

In a conventional apochromatic lens systems, since spherical aberration is mainly corrected through the first lens group, the first lens group has an intense function for correcting spherical aberration. Accordingly, it has been known that spherical aberration is over-corrected with respect to shorter wave-lengths, and spherochromatic aberration, which is a variation of spherical aberration with a wavelength, is intensified. On the other hand, in the apochromatic lens system of the present invention, since the function for correcting spherical aberration is distributed over the first and second lens groups; whereby the degree of the function for correcting spherical aberration for each lens group can be reduced (weakened), so that spherochromatic aberration is made smaller.

Condition (5) determines an adequately weakened function for correcting spherical aberration in the first lens group which is composed of, in order from the object, a biconvex lens element and a negative lens element having a strongly-powered concave surface facing the object; whereby satisfactorily optimum optical performance is obtained while spherochromatic aberration is reduced.

If $r_1/r_2$ is lower than the lower limit, spherical aberration generated on the object-side biconvex lens element in the first lens group is too excessive. Therefore the function for correcting spherical aberration by the negative lens element has to be made stronger, which results in larger spherochromatic aberration, since the function for correcting spherical aberration in the first lens group becomes too strong.

If $r_1/r_2$ is higher than the upper limit, the function for correcting spherical aberration in the first lens group becomes too weak. Therefore the function for correcting spherical aberration in the second lens group has to be made stronger, which results in larger spherochromatic aberration.

Specific numerical data of the embodiments will be described below through the tables and diagrams. $F_{NO}$ designates the F-number, f designates the focal-length, W designates the half angle of view, and $f_B$ designates the back focal distance. R designates the radius of curvature of each lens surface, D designates the lens thickness or distance, $N_d$ designates the refractive index with respect to the d-line, and $v_d$ designates the Abbe number. The d, g and c lines designate chromatic aberration, which are represented by spherical aberration at the respective wave length; and also the d, g and c lines designate lateral chromatic aberration. S designates the sagittal image, and M designates the meridional image.

[Embodiment 1]

FIG. 1 is a lens arrangement of the first embodiment of an apochromatic lens system according to the present invention; FIGS. 2A, 2B, 2C and 2D are aberration diagrams of the lens system in FIG. 1; and Table 1 shows the numerical data thereof. The lens system of this embodiment includes, in order from the object, a first lens group (I) having a biconvex lens element and a biconcave lens element, and a second lens group (II) having a biconvex lens element and a biconcave lens element.

TABLE 1

$F_{NO} = 1:6.7$
$f = 100.00$
$W = 2.5°$
$fB = 59.59$

| Surface No. | R | D | $N_d$ | $\nu_d$ |
|---|---|---|---|---|
| 1 | 47.708 | 2.00 | 1.51633 | 64.1 |
| 2 | −121.880 | 0.10 | — | — |
| 3 | −104.129 | 1.50 | 1.62004 | 36.3 |
| 4 | 229.191 | 50.57 | — | — |
| 5 | 47.812 | 1.20 | 1.49700 | 81.6 |
| 6 | −29.343 | 1.43 | — | — |
| 7 | −26.244 | 0.80 | 1.51633 | 64.1 |
| 8 | 142.600 | — | — | — |

[Embodiment 2]

FIG. 3 is a lens arrangement of the second embodiment of an apochromatic lens system according to the present invention; FIGS. 4A, 4B, 4C and 4D are aberration diagrams of the lens system in FIG. 3; and Table 2 shows the numerical data thereof. The lens system of this embodiment includes, in order from the object, a first lens group (I) having a biconvex lens element and a biconcave lens element, and a second lens group (II) having a biconvex lens element and a biconcave lens element.

TABLE 2

$F_{NO} = 1:6.7$
$f = 100.00$
$W = 2.5°$
$fB = 35.78$

| Surface No. | R | D | $N_d$ | $\nu_d$ |
|---|---|---|---|---|
| 1 | 47.385 | 2.00 | 1.48749 | 70.2 |
| 2 | −56.254 | 0.10 | — | — |
| 3 | −55.868 | 1.50 | 1.56732 | 42.8 |
| 4 | 415.731 | 78.38 | — | — |
| 5 | 23.270 | 1.00 | 1.48749 | 70.2 |
| 6 | −328.385 | 0.80 | — | — |
| 7 | −69.770 | 0.70 | 1.53172 | 48.9 |
| 8 | 55.820 | — | — | — |

[Embodiment 3]

Figure 5:
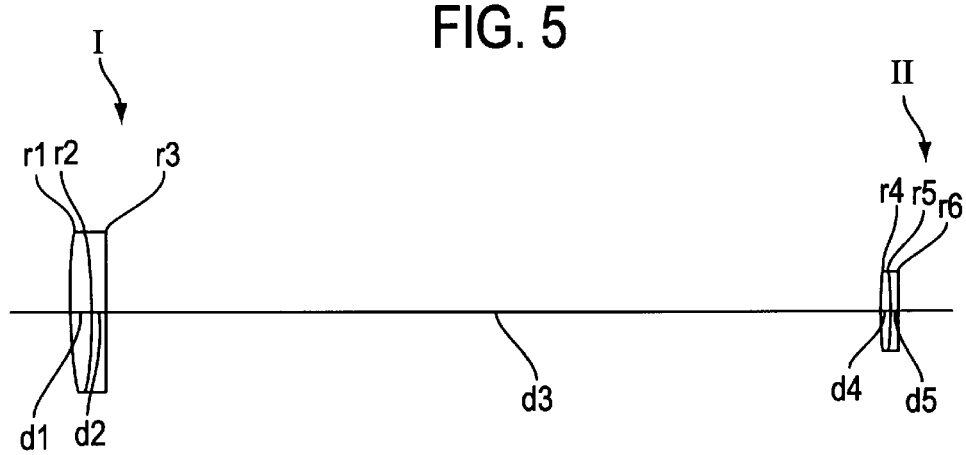
FIG. 5 is a lens arrangement of the third embodiment of an apochromatic lens system according to the present invention.
Figure 6A:
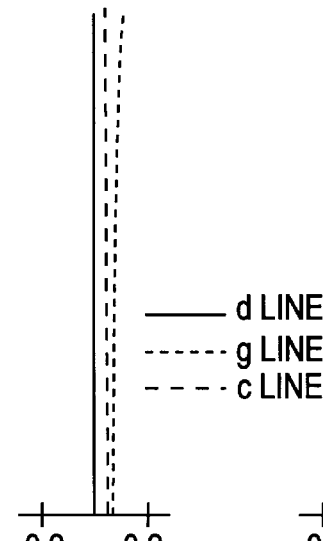
FIGS. 6A, 6B, 6C and 6D are aberration diagrams of the lens system in FIG. 5.
Figure 6B:
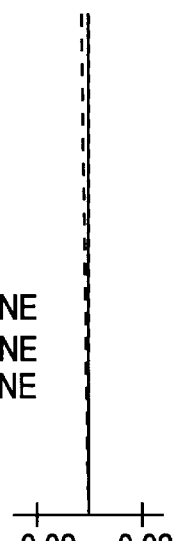
Figure 6C:
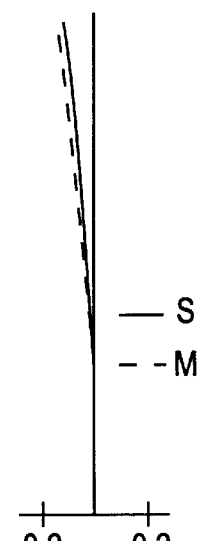
Figure 6D:
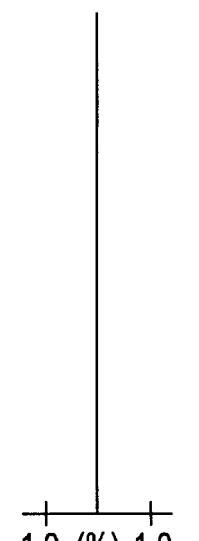

FIG. 5 is a lens arrangement of the third embodiment of an apochromatic lens system according to the present invention; FIGS. 6A, 6B, 6C and 6D are aberration diagrams of the lens system in FIG. 5; and Table 3 shows the numerical data thereof. The lens system of this embodiment includes, in order from the object, a first lens group (I) having a cemented lens composed of a biconvex lens element and a negative meniscus lens element, and a second lens group (II) having a cemented lens composed of a biconvex lens element and a biconcave lens element.

TABLE 3

$F_{NO} = 1:6.7$
$f = 100.04$
$W = 2.5°$
$fB = 44.46$

| Surface No. | R | D | $N_d$ | $\nu_d$ |
|---|---|---|---|---|
| 1 | 64.000 | 2.00 | 1.51633 | 64.1 |
| 2 | −64.000 | 1.50 | 1.62004 | 36.3 |
| 3 | −697.600 | 71.88 | — | — |
| 4 | 49.192 | 0.80 | 1.49700 | 81.6 |
| 5 | −21.344 | 0.66 | 1.51633 | 64.1 |
| 6 | 148.942 | — | — | — |

[Embodiment 4]

FIG. 7 is a lens arrangement of the fourth embodiment of an apochromatic lens according to the present invention; FIGS. 8A, 8B, 8C and 8D are aberration diagrams of the lens system in FIG. 7; and Table 4 shows the numerical data thereof. The lens system of this embodiment includes, in order from the object, a first lens group (I) having a biconvex lens element and a biconcave lens element, and a second lens group (II) having a negative meniscus lens element and a biconvex lens element.

TABLE 4

$F_{NO} = 1:6.7$
$f = 100.00$
$W = 2.5°$
$fB = 50.58$

| Surface No. | R | D | $N_d$ | $\nu_d$ |
|---|---|---|---|---|
| 1 | 49.968 | 2.00 | 1.48749 | 70.2 |
| 2 | −42.134 | 0.10 | — | — |
| 3 | −42.707 | 1.50 | 1.54072 | 47.2 |
| 4 | 391.858 | 64.22 | — | — |
| 5 | −19.353 | 0.70 | 1.51633 | 64.1 |
| 6 | −45.950 | 0.04 | — | — |
| 7 | 161.052 | 1.00 | 1.43875 | 95.0 |
| 8 | −24.637 | — | — | — |

[Embodiment 5]

Figure 9:
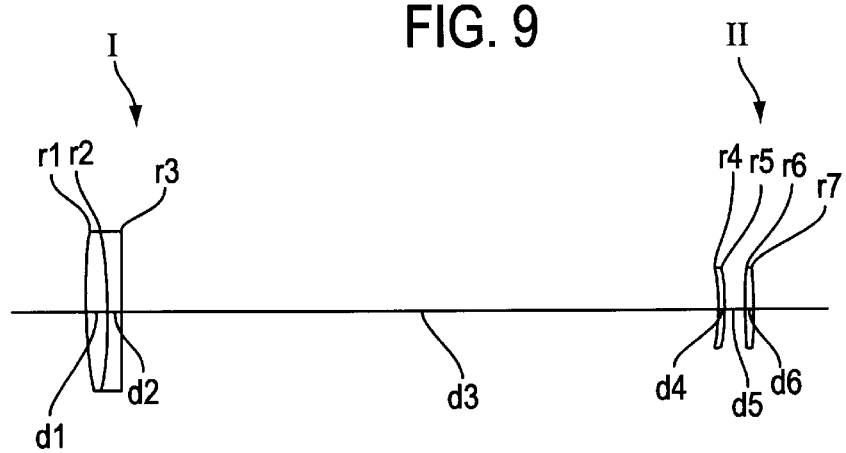
FIG. 9 is a lens arrangement of the fifth embodiment of an apochromatic lens according to the present invention.
Figure 10A:
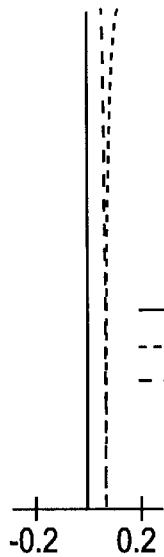
FIGS. 10A, 10B, 10C, 10D are aberration diagrams of the lens system in FIG. 9.
Figure 10B:
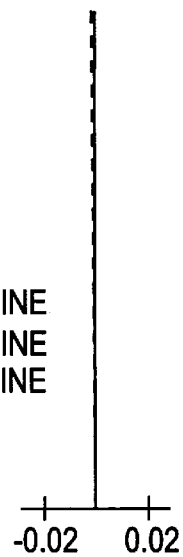
Figure 10C:
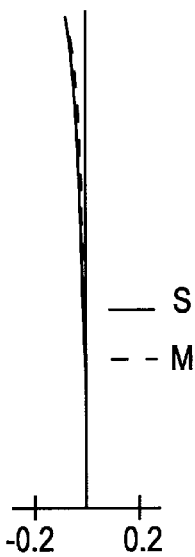
Figure 10D:
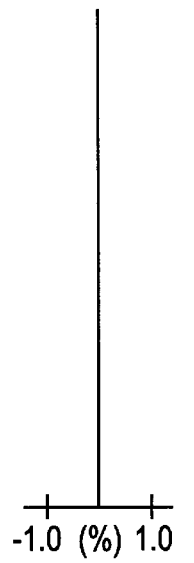

FIG. 9 is a lens arrangement of the fifth embodiment of an apochromatic lens according to the present invention; FIGS. 10A, 10B, 10C, 10D are aberration diagrams of the lens system in FIG. 9; and Table 5 shows the numerical data thereof. The lens system of this embodiment includes, in order from the object, a first lens group (I) having a cemented lens composed of a biconvex lens element and a biconcave lens element, and a second lens group (II) having a negative meniscus lens element and a biconvex lens element.

TABLE 5

$F_{NO}$ = 1:6.7
f = 100.01
W = 2.5°
fB = 48.34

| Surface No. | R | D | $N_d$ | $v_d$ |
|---|---|---|---|---|
| 1 | 39.207 | 2.00 | 1.48749 | 70.2 |
| 2 | −58.543 | 1.50 | 1.56732 | 42.8 |
| 3 | 214.963 | 56.09 | — | — |
| 4 | −25.900 | 0.7 | 1.53172 | 48.9 |
| 5 | −46.478 | 2.00 | — | — |
| 6 | 79.386 | 0.80 | 1.48749 | 70.2 |
| 7 | −79.386 | — | — | — |

Table 6 shows the numerical data for each condition of each embodiment.

TABLE 6

|  | Emb. 1 | Emb. 2 | Emb. 3 | Emb. 4 | Emb. 5 |
|---|---|---|---|---|---|
| Cond. (1) | 64.1 | 70.2 | 64.1 | 70.2 | 70.2 |
| Cond. (2) | 81.6 | 70.2 | 81.6 | 95.0 | 70.2 |
| Cond. (3) | 1.539 | 1.332 | 1.363 | 1.359 | 1.173 |
| Cond. (4) | 0.506 | 0.784 | 0.719 | 0.642 | 0.561 |
| Cond. (5) | −0.391 | −0.842 | −1.000 | −1.186 | −0.670 |

In each embodiment, conditions (1) through (5) are satisfied and the various aberrations are satisfactorily corrected.

According to the present invention, a low cost apochromatic lens system which can correct axial chromatic aberration satisfactorily has been attained.

What is claimed is:

1. An apochromatic lens system comprising a positive first lens group and a positive second lens group in this order from the object; wherein the following conditions are satisfied:

$v_{I+}<80$ $v_{II+}>70$ $1.1<f_I/f<2.0$ wherein $v_{I+}$ designates the largest Abbe number of a positive lens element in said first lens group;

$v_{II+}$ designates the largest Abbe number of a positive lens element in said second lens group;

$f_I$ designates the focal length of said first lens group; and f designates the focal length of the entire lens system.

2. The apochromatic lens according to claim 1, wherein said positive lens element is the only one positive lens element for each of said first lens group and said second lens group respectively.

3. The apochromatic lens according to claim 1, wherein the following condition is satisfied:

$0.4<L/f<0.9$ wherein

L designates the distance from the final lens surface, from the object, of said first lens group to the first lens surface, facing the object, of said second lens group.

4. The apochromatic lens according to claim 1, wherein said first lens group comprises, in order from the object, a biconvex lens element and a negative lens element having a concave surface facing the object; and wherein the following condition is satisfied:

$-1.5<r_1/r_2<-0.3$ wherein $r_1$ designates the radius of curvature of the first lens surface, facing the object, of said biconvex lens element; and $r_2$ designates the radius of curvature of the second lens surface, from the object, of said biconvex lens element.

5. The apochromatic lens system according to claim 4, wherein said biconvex lens and said negative lens having a concave surface facing the object are cemented.

6. The apochromatic lens system according to claim 1, wherein said apochromatic lens system is used as an objective lens for an astronomical telescope.

* * * * *